United States Patent
Hwang (10) Patent No.: US 6,626,809 B2
(45) Date of Patent: Sep. 30, 2003

(54) CUTTER DEPOT STRUCTURE FOR USE IN GENERAL MACHINING CENTER

(76) Inventor: Yaw-Der Hwang, 1069-10, Chung-San Rd. Shen-Kan Village, Taichung (TW)

( * ) Notice: Subject to any disclaimer, the term of this patent is extended or adjusted under 35 U.S.C. 154(b) by 0 days.

(21) Appl. No.: 09/900,122

(22) Filed: Jul. 6, 2001

(65) Prior Publication Data

US 2003/0005804 A1 Jan. 9, 2003

(51) Int. Cl.[7] ................. B23Q 3/155; B23Q 3/157; B65G 1/06; B65G 47/06
(52) U.S. Cl. ................. 483/62; 483/60; 483/67
(58) Field of Search ................. 483/60, 62, 66, 483/67; 211/1.53, 1.55

(56) References Cited

U.S. PATENT DOCUMENTS

| | | | | |
|---|---|---|---|---|
| 5,395,297 A | * | 3/1995 | Takada et al. | 483/25 |
| 5,554,087 A | * | 9/1996 | Hwang et al. | 483/62 |
| 5,704,885 A | * | 1/1998 | Lee | 483/62 |
| 6,102,840 A | * | 8/2000 | Xiao | 483/67 |
| 6,203,479 B1 | * | 3/2001 | Gengo et al. | 483/62 |
| 6,245,003 B1 | * | 6/2001 | Pollington et al. | 483/59 |

* cited by examiner

*Primary Examiner*—Derris H. Banks
*Assistant Examiner*—Ali Abdelwahed
(74) *Attorney, Agent, or Firm*—W. Wayne Liauh (57) ABSTRACT

A machining center is provided with a cutter depot structure comprising a cutter socket, a cutter disk, and a round machine frame. The cutter socket is rotatably mounted on the periphery of the cutter disk by a retaining pin which is put through an L-shaped rod of the cutter socket. The L-shaped rod is provided with a roller. The cutter disk is provided with an annular stop surface. The round machine frame is provided with a wearproof annular pad having a cut. The cutter socket in motion is confined by the stop surface of the cutter disk and the annular pad of the machine frame such that the cutter socket is kept in the horizontal state. The cutter socket is turned on the retaining pin to facilitate the inverting of the cutter, thereby resulting in reduction in length of a cutter exchanging arm.

4 Claims, 8 Drawing Sheets

CUTTER DEPOT STRUCTURE FOR USE IN GENERAL MACHINING CENTER

FIELD OF THE INVENTION

The present invention relates generally to a general machining center, and more particularly to a cutter depot structure of the general machining center.

BACKGROUND OF THE INVENTION

The general machining center is provided with a disk-type cutter depot from which a desired cutter is selected in conjunction with a computer program. The cutter socket is horizontally disposed in the cutter depot. In order to facilitate the cutter exchange, the cutter exchanging point of the cutter depot is provided with a cut to enable the cutter socket to invert the cutter, thereby enabling the cutter exchanging arm to hold and deposit the cutter. As a result, in the course of the cutter exchange, the cutter socket is swiveled from the horizontal position to the vertical position, and then back to the original horizontal position. The swiveling motion of the cutter socket is attained by an elevation mechanism and a roller which is driven by the elevation mechanism to enable the cutter socket to swivel at the cut of the cutter exchanging point of the cutter depot. The cutter socket is provided with a retaining pin which is fastened with the cutter disk to serve as a rotating center of the cutter socket. Under the circumstance that the cutter socket is capable of turning freely, the cutter socket is kept in the downward state on the cutter disk in view of the gravitational direction. In order to prevent such a situation from taking place, it is necessary to confine the rotation of the cutter socket so as to ensure that the cutter socket moves on the cutter disk in accordance with the preset program.

Figure 1:
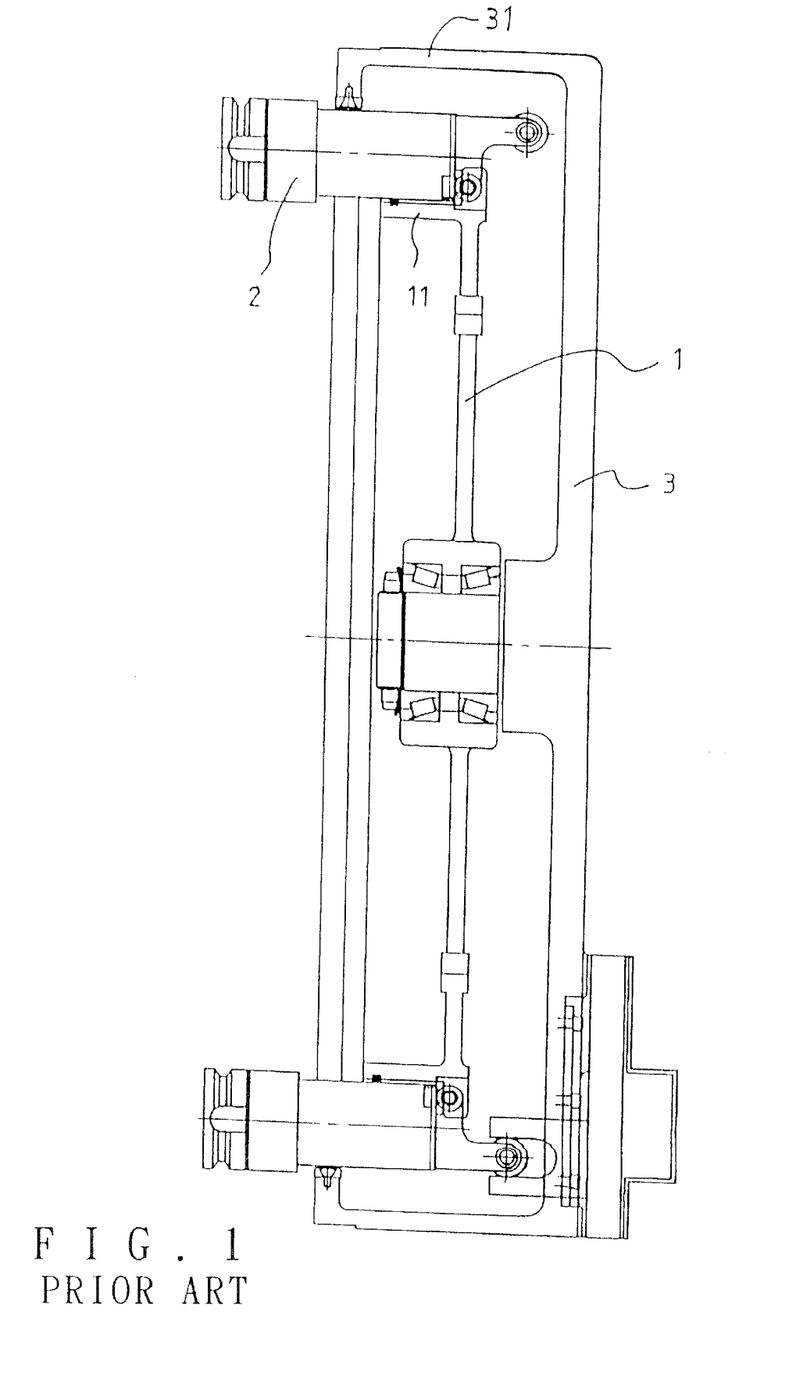
FIG. 1 shows a schematic view of a cutter depot confining structure disclosed in the Taiwan Patent Serial No. 84211224.

With the purpose of confining the cutter socket, this inventor of the present invention discloses a cutter depot structure in the Taiwan Patent Serial No. 84211224. As shown in FIG. 1, the cutter depot structure comprises a cutter disk 1, which is provided in the outer periphery with an annular protruded edge 11 serving to confine the inward motion of the cutter socket 2. In addition, a machine frame 3 is provided with a stop edge 31, which serves to confine the outward motion of the cutter socket 2. When the cutter disk 1 is in action, the cutter socket 2 is confined by the protruded edge 11 of the cutter disk 1 and the stop edge 31 of the machine frame 3 such that the cutter socket 2 is kept in the horizontal state, and that cutter socket 2 is confined to move in the annular slot rail formed by the protruded edge 11 and the stop edge 31. Such a cutter socket confining structure as described above is not cost-effective in view of the fact that the casting of the protruded edge 11 of the cutter disk 1 and the stop edge 31 of the machine frame 3 calls for an additional capital expenditure.

Figure 2:
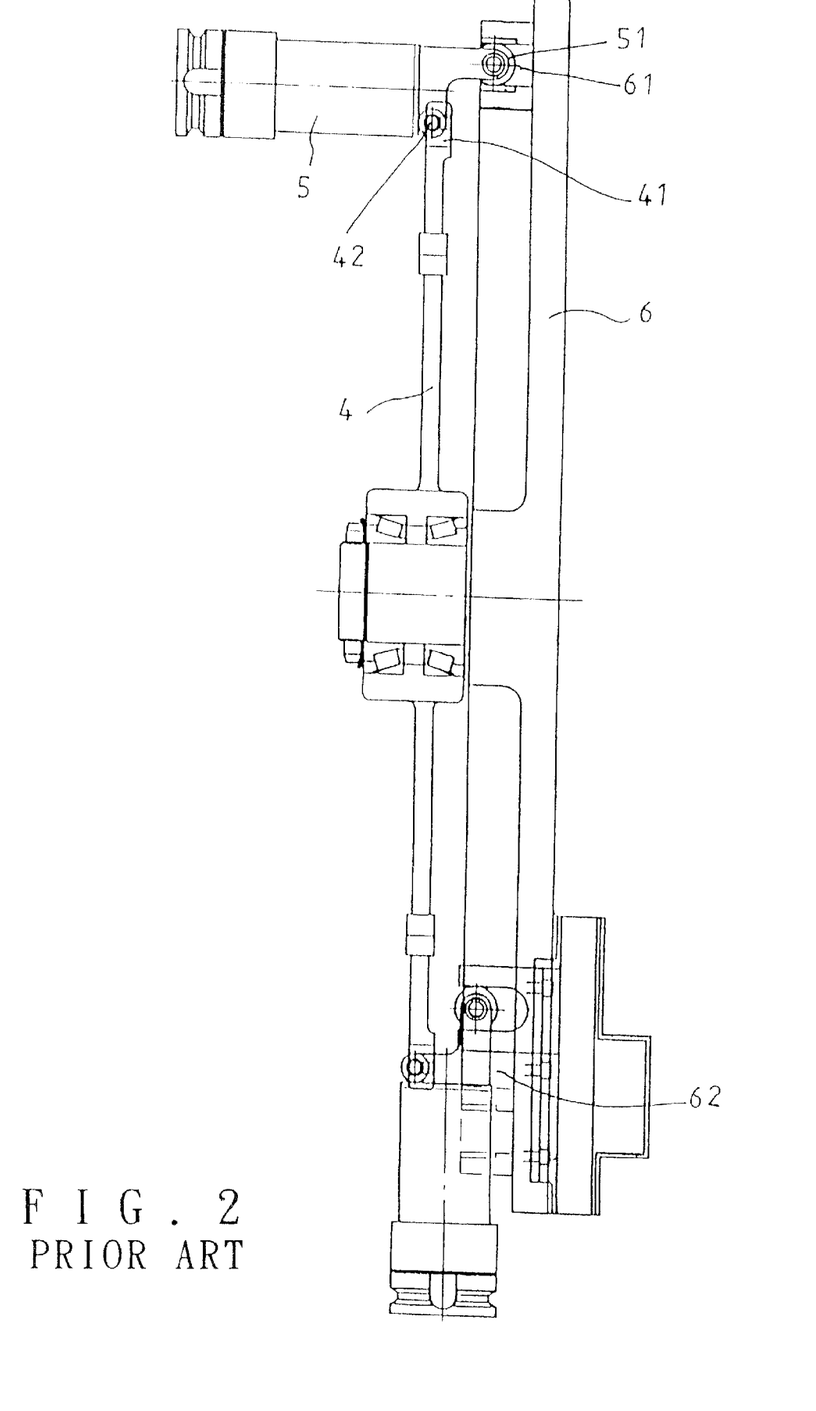
FIG. 2 shows a schematic view of a cutter depot confining structure disclosed in the Taiwan Patent Serial No. 87212806.

In light of the disadvantage of the cutter depot structure described above with reference to FIG. 1, this inventor of the present invention discloses another cutter depot structure in the Taiwan Patent Serial No. 87212806. As shown in FIG. 2, this cutter depot structure comprises a cutter disk 4 which is provided in the outer periphery with a protruded block 41 which is arranged in a radiate manner to facilitate the mounting of a cutter socket 5 on the outer periphery of the cutter disk 4 in conjunction with a retaining pin 42. The cutter depot structure further comprises a machine frame 6 which is provided with an annular guide slot 61 having a cut 62 and accommodating a roller 51. When the cutter disk 4 is turned, the roller 51 moves along the annular guide slot 61 of the machine frame 6 so as to enable the cutter socket 5 to keep moving horizontally. In spite of being relatively cost-effective, the cutter depot structure is deficient in design in that the cutter socket is turned on the retaining pin which serves as a rotating axis, and that the cutter socket swivels downwards in the course of inverting the cutter, thereby calling for the use of a cutter-exchanging arm of a constant length to carry out the cutter-removing action and the cutter mounting action. Such a mechanical set-up as described above calls for the use of various peripheral parts which are not only costly but also take up additional space.

SUMMARY OF THE INVENTION

The primary objective of the present invention is to provide a general machining center with a cost-effective cutter depot structure.

It is another objective of the present invention to provide a general machining center with a space-saving cutter depot structure which does not take up too much of the available space of the general machining center.

It is still another objective of the present invention to provide a cutter depot structure with a cutter exchanging arm which has a relatively short length to facilitate the mounting of the peripheral elements.

In keeping with the principle of the present invention, the foregoing objectives of the present invention are attained by a cutter depot structure comprising a cutter socket which is provided with an L-shaped rod having a roller. A retaining pin is put through the L-shaped rod to fasten the cutter socket on the protruded block which is formed integrally on the periphery of a cutter disk. The cutter disk is provided with an annular stop surface of an inclination and opposite in location to the roller of the cutter socket. The cutter depot structure further comprises a round machine frame which is fastened with a center shaft of the cutter disk and is provided with a wearproof annular pad having a cut. When the cutter socket is actuated by the cutter disk to rotate, the roller of the cutter socket is urged by the annular stop surface of the cutter disk, so as to prevent the cutter socket from swiveling inwards. In the meantime, the annular pad of the round machine frame serves to prevent the cutter socket from swiveling outwards. As a result, the cutter socket in motion is always kept in a horizontal position. The present invention is therefore capable of a precision confinement of the cutter socket in motion. In addition, the present invention is provided with the annular pad which replaces the annular guide slot of the prior art to lower the cost of the cutter depot structure.

When the cutter socket in motion arrives at the position of the cut of the machine frame, the cutter socket is driven by a drive mechanism to swivel backwards on the retaining pin serving as a fulcrum. As a result, when the cutter socket is engaged in the action of inverting the cutter, the distance between the cutter handle and a cutter exchanging arm is shortened. For this reason, the cutter exchanging arm of the present invention is relatively short so as to facilitate the mounting of peripheral elements.

The features and the advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 3:
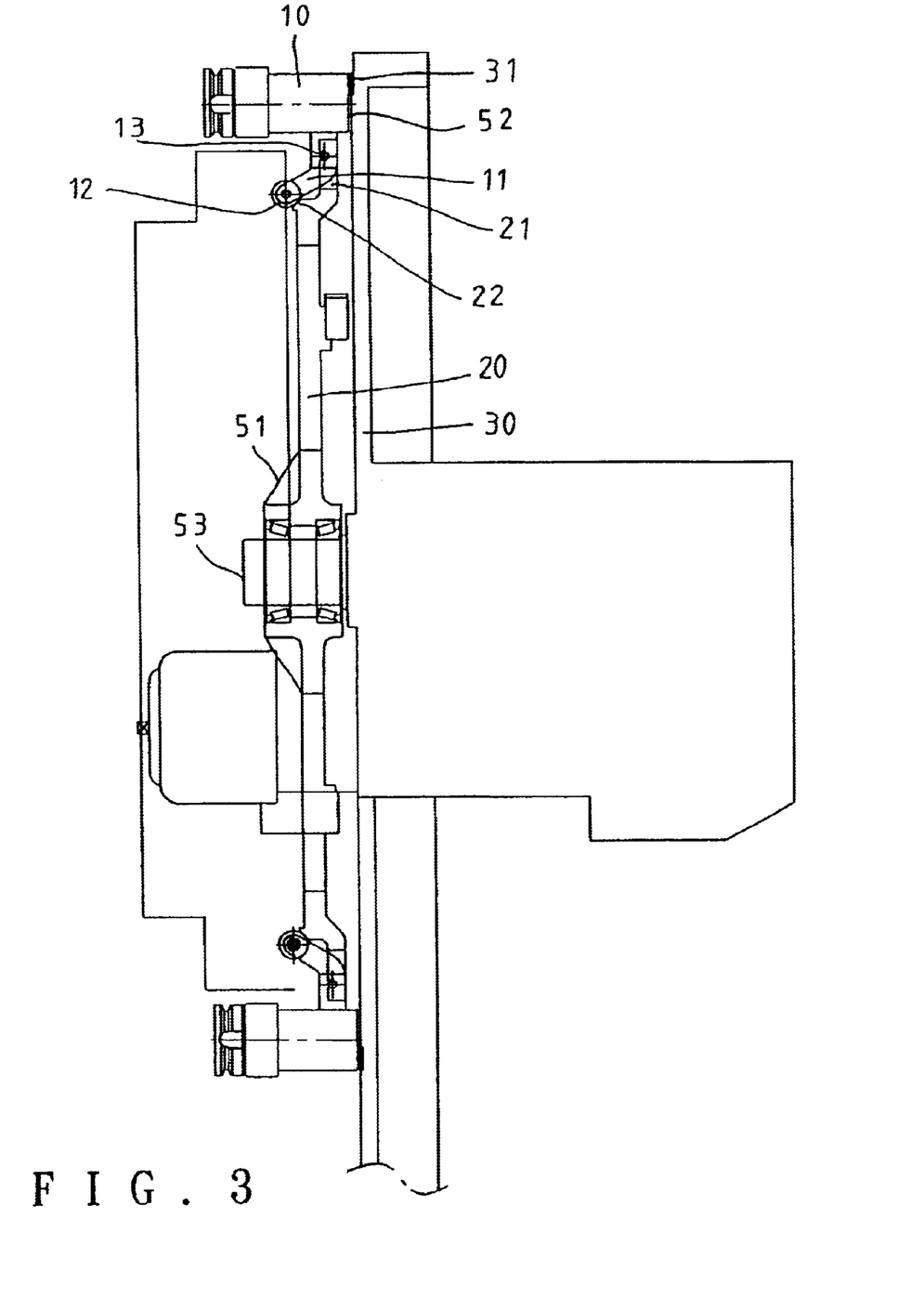
FIG. 3 shows a schematic view of a cutter socket of the present invention which is assembled with a cutter disk.
Figure 4:
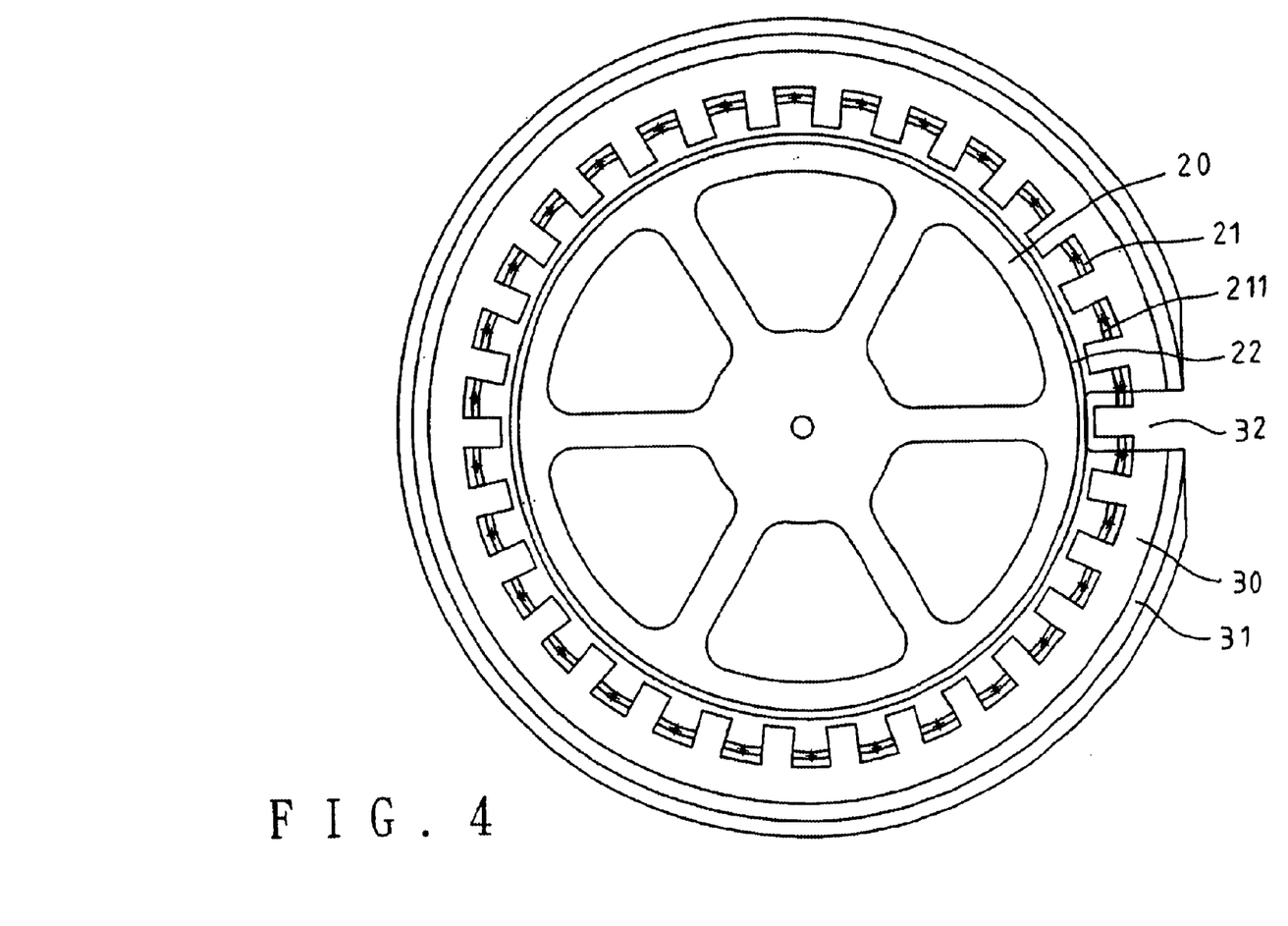
FIG. 4 shows a schematic view of the cutter disk of FIG. 3 and a round machine frame.
Figure 5:
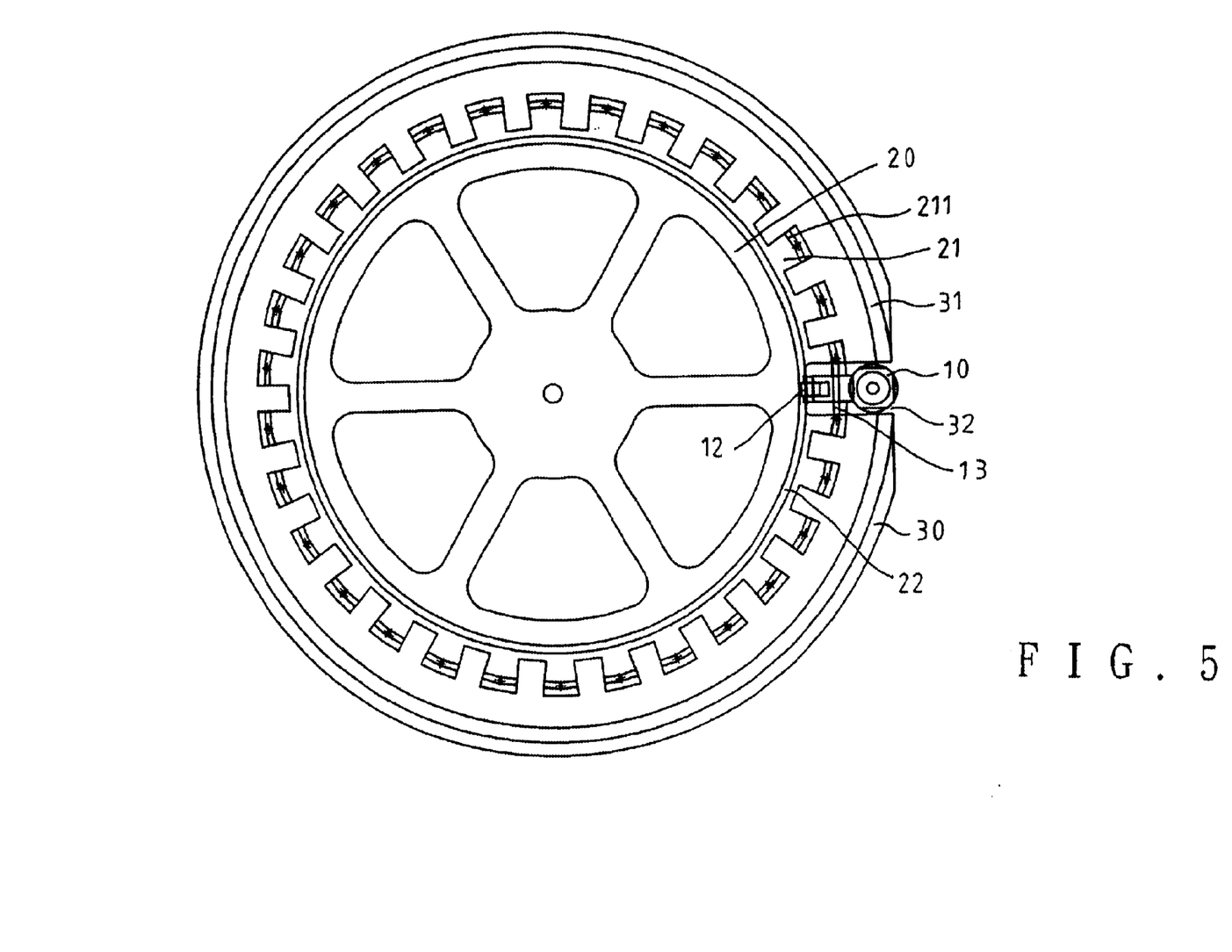
FIG. 5 shows a side schematic view of the present invention as shown in FIG. 3.

As shown in FIGS. 3–6, a utter socket 10 of the present invention is provided with two L-shaped rods 11 which are parallel to each other and are provided at the end with a roller 12. The L-shaped rods 11 are further provided with a through hole (not shown in the drawings) through which a retaining pin 13 is disposed. A cutter disk 20 is provided in the periphery thereof with a plurality of radially extending protruded blocks 21. Each of the protruded blocks is of a stepped construction and, collectively, the plurality of protruded blocks are arranged in a radiate manner. Each protruded block 21 is provide with a retaining slot 211 for receiving the retaining pin 13 such that the retaining pin 13 is pressed against the protruded block 21 by means of the press piece or screw. The cutter socket 10 is rotatably mounted on the periphery of the cutter disk 20 such that the cutter socket 10 is capable of turning freely on the retaining pin 13 serving as a rotating axis. FIG. 3 also shows that the cutter disk 20 is mounted on a center shaft 53 with a bearing 51, such that the cutter disk 20 can be driven to turn when connected to a power source (not shown). FIG. 3 also shows that a round machine frame 30 is fastened with the center shaft 53 of the cutter. The round machine frame 30 is provide with an annular pad 31 for urging the rear surface 52 of said cutter socket 10. FIG. 5 shows that both the round machine frame 30 and the annular pad have a cut 32 with a width slightly greater than a diameter of the cutter socket.

Figure 6:
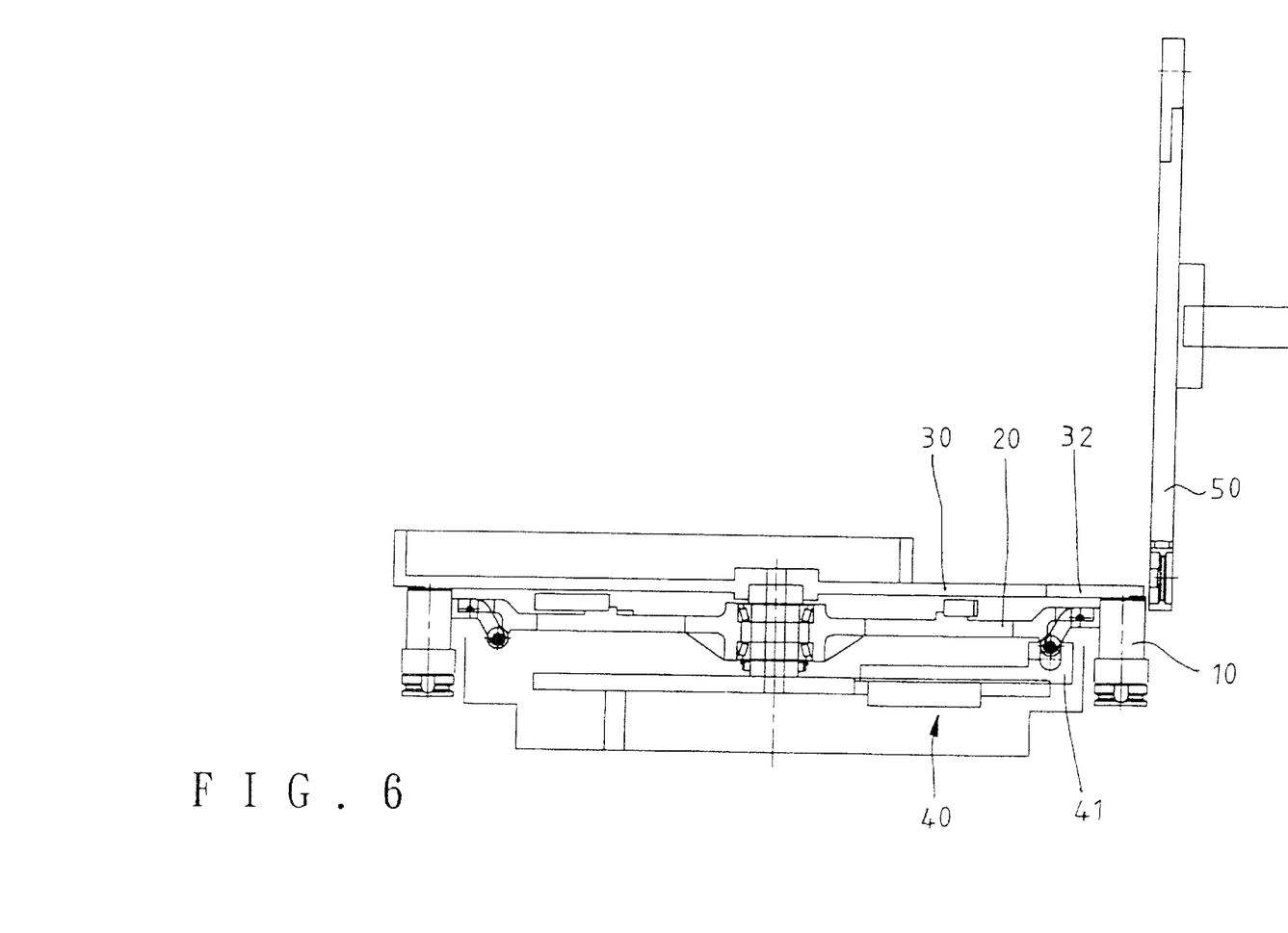
FIG. 6 shows a top plan view of the present invention as shown in FIG. 3.
Figure 7:
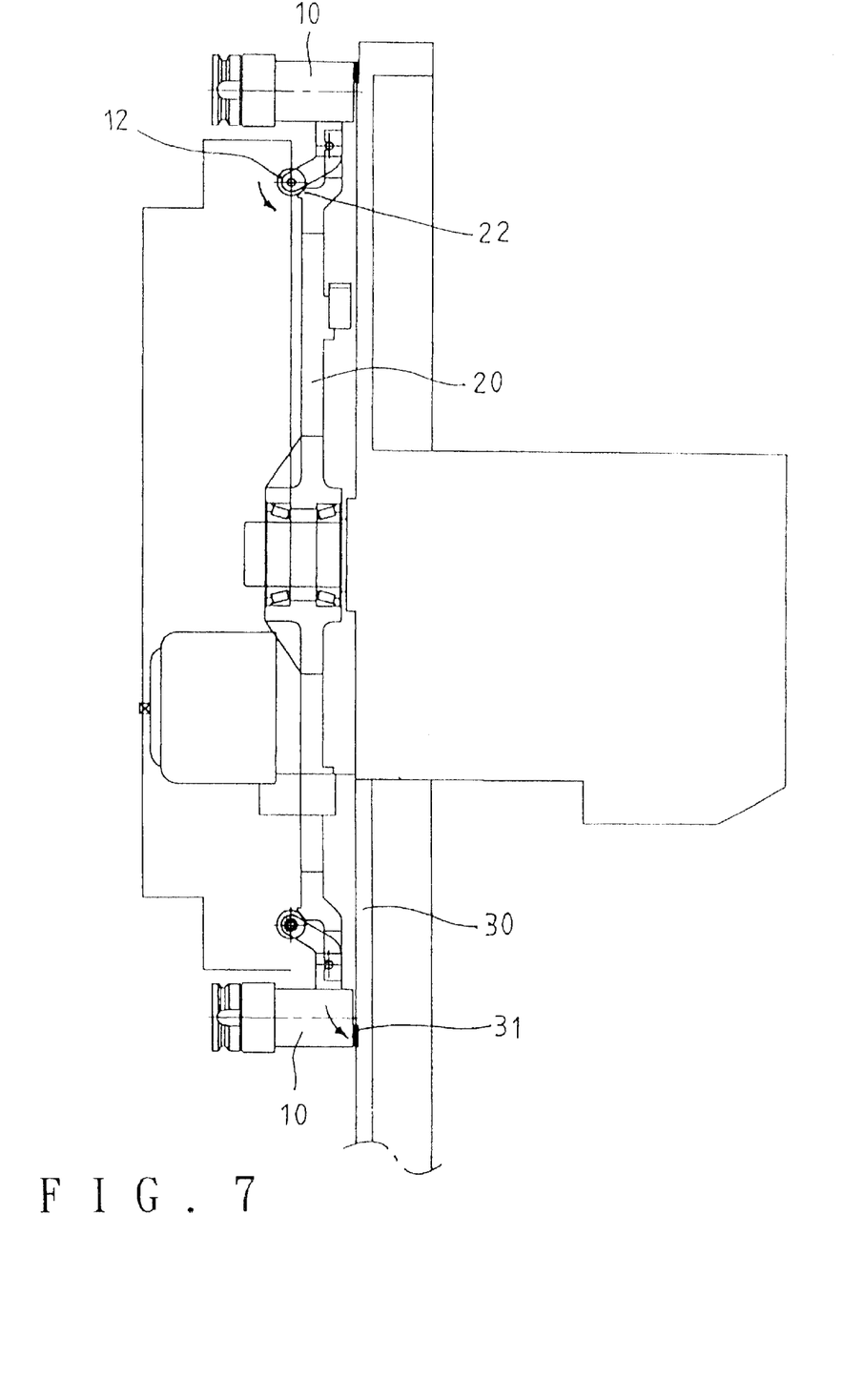
FIG. 7 shows a schematic view of the present invention in use.
Figure 8:
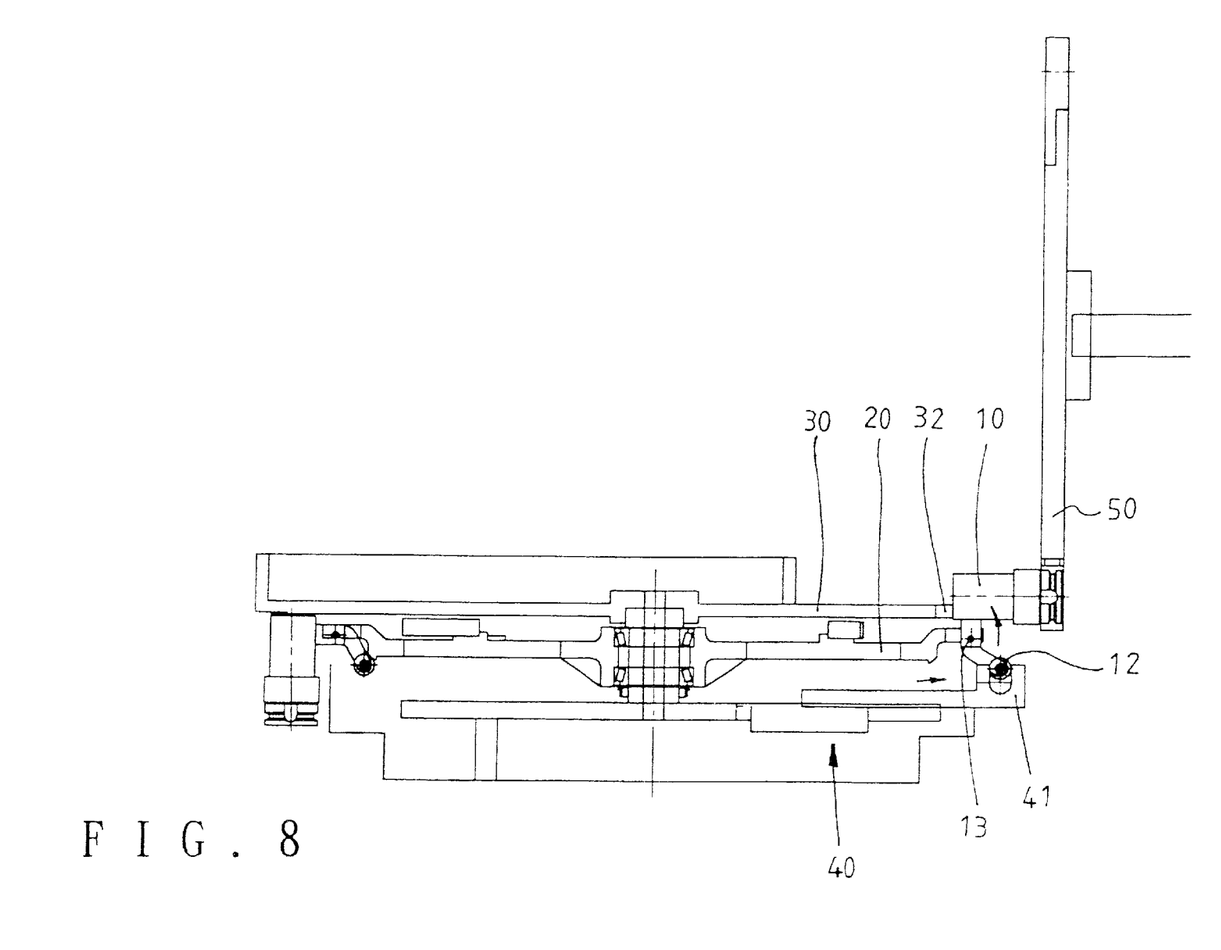
FIG. 8 is a schematic view of the present invention in action to show the cutter inverting motion.

As shown in FIG. 4, the cutter disk 20 is provided with an annular stop surface 22 having an inclination and corresponding in location th the roller 12 of the cutter socket 10. A round machine frame 30 is fastened with the cutter disk 20 and is provided with a cut 32 and a wearproof annular pad 31. As shown in FIG. 6, a drive mechanism 40 is mounted in front of the cutter disk 20 and is provided with a protrusion 41. The drive mechanism 40 is used to control the cutter-inverting action of the cutter socket 10. A cutter exchanging arm 50 is mounted behind the round machine frame 30 for changing the cutter. As shown in FIG. 7, the cutter socket 10 is actuated by the cutter disk 20 to turn. In order to prevent the cutter socket 10 from plumbing due to its weight, the roller 12 of the cutter socket 10 is urged by the annular stop surface 22 of the cutter disk 20. The cutter socket 10 is thus prevented from swiveling inwards. In the meantime, the annular pad 31 of the round machine frame 30 urges the rear of the cutter socket 10, thereby preventing the cutter socket 10 from swiveling outwards. As a result, the cutter socket 10 is kept in the horizontal state at the time when the cutter socket 10 is turning. Now referring to FIG. 8. As the cutter socket 10 in motion is arrived at the position of the cut 32 of the round machine frame 30, the roller 12 of the cutter socket 10 enters the protrusion 41 of a U-shaped construction. As soon as the protrusion 41 is driven by the drive mechanism 40 to move forward, the cutter socket 10 is actuated to turn on the retaining pin 13 serving as a point of support. Th cutter socket 10 swivels rearwards at the cut 32 of the round machine frame 30. In light of the taming pin 13 being located at the side of the cutter socket 10, the distance between the cutter handle and the cutter-exchanging arm 50 is shortened at the time when the cutter socket 10 is engaged in the action of inverting the cutter. The length of the cutter exchanging arm 50 is shortened to facilitate the mounting of the peripheral elements.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following claims.

What is claimed is:

1. A cutter depot structure for use in a machining center, said cutter depot structure comprising:

a cutter socket provided with an L-shaped rod which is provided at one end with a roller and is retained by a retaining pin;

a cutter disk provided in a periphery thereof with a plurality of radially extending protruded blocks each having a stepped construction for fastening said retaining pin, said cutter disk further being provided with an annular stop surface opposite in location to said roller of said cutter socket, said cutter disk being mounted on a center shaft with a bearing such that said cutter disk is driven to turn when connected to a power source; and a round machine frame being fastened with said center shaft and provided with an annular rod for urging a rear surface of said cutter socket, said round machine frame and said annular pad having a cut with a with slightly greater than a diameter of said cutter socket.

2. The cutter depot structure as defined in claim 1, wherein said cutter disk is provided at a front side with a drive mechanism having a U-shaped protrusion, said drive mechanism being used to actuate said cutter sock to swivel rearwards at said cut of said annular pad of said round machine frame, thereby resulting in reduction in of a distance between a cutter handle and a cutter exchanging arm.

3. The cutter depot structure as defined in claim 1, wherein said annular pad of said round machine frame is made of a wearproof material.

4. The cutter depot structure as defined in claim 1, wherein said annular stop surface of said cutter disk has an inclination.

* * * * *